(12) United States Patent
Ye et al.

(10) Patent No.: US 12,550,161 B2
(45) Date of Patent: Feb. 10, 2026

(54) METHODS FOR DCI CONFIGURATIONS AND PROCEDURES WITH MULTI-CELL SCHEDULING DCI

(71) Applicant: Apple Inc., Cupertino, CA (US)

(72) Inventors: Sigen Ye, San Diego, CA (US); Weidong Yang, San Diego, CA (US); Haitong Sun, Cupertino, CA (US); Chunhai Yao, Beijing (CN); Yushu Zhang, Beijing (CN); Wei Zeng, Saratoga, CA (US); Dawei Zhang, Saratoga, CA (US); Seyed Ali Akbar Fakoorian, San Diego, CA (US); Huaning Niu, San Jose, CA (US)

(73) Assignee: APPLE INC., Cupertino, CA (US)

(*) Notice: Subject to any disclaimer, the term of this patent is extended or adjusted under 35 U.S.C. 154(b) by 293 days.

(21) Appl. No.: 18/116,168

(22) Filed: Mar. 1, 2023

(65) Prior Publication Data
US 2023/0354363 A1 Nov. 2, 2023

Related U.S. Application Data

(60) Provisional application No. 63/336,377, filed on Apr. 29, 2022.

(51) Int. Cl.
*H04W 72/232* (2023.01)
*H04W 72/12* (2023.01)

(52) U.S. Cl.
CPC ......... *H04W 72/232* (2023.01); *H04W 72/12* (2013.01)

(58) Field of Classification Search
CPC .................... H04W 72/232; H04W 72/12
See application file for complete search history.

(56) References Cited

U.S. PATENT DOCUMENTS

| | | | | |
|---|---|---|---|---|
| 11,005,637 B2* | 5/2021 | Yi | ........................ | H04W 76/11 |
| 2014/0071918 A1* | 3/2014 | Park | ...................... | H04W 72/23 |
| | | | | 370/329 |

(Continued)

FOREIGN PATENT DOCUMENTS

| | | |
|---|---|---|
| EP | 4093130 A1 | 11/2022 |
| EP | 4113854 A1 | 1/2023 |
| EP | 4195846 A1 | 6/2023 |

OTHER PUBLICATIONS

International Search Report of the International Searching Authority, Application No. PCT/US2023/019965, dated Sep. 4, 2023, 4 pages.

(Continued)

*Primary Examiner* — Jael M Ulysse
(74) *Attorney, Agent, or Firm* — Sterne, Kessler, Goldstein & Fox, P.L.L.C.

(57) ABSTRACT

Described are approaches to multi-cell PUSCH/PDSCH scheduling with a single DCI (downlink control information) in a wireless communication system. In one approach, only one component carrier is configured with the multi-cell scheduling DCIs, with no DCI configured on the other component carriers. In a second approach, all of the component carriers can be configured with the multi-cell scheduling DCIs. In a third option, one component carrier is configured with multi-cell scheduling DCI only, while the other component carriers can be configured with the legacy single-cell scheduling DCIs. In a fourth option, one component carrier is configured with both multi-cell scheduling DCIs and the legacy single-cell scheduling DCIs, while the other component carriers can be configured with the legacy single-cell scheduling DCIs. In the fifth option, all the component carriers can be configured with both multi-cell scheduling DCIs and the legacy single-cell scheduling DCIs.

18 Claims, 5 Drawing Sheets

(56) References Cited

U.S. PATENT DOCUMENTS

| | | | | |
|---|---|---|---|---|
| 2016/0198486 A1* | 7/2016 | Moshavi | H04W 72/12 455/450 |
| 2019/0141726 A1* | 5/2019 | Wang | H04W 76/10 |
| 2020/0351903 A1* | 11/2020 | Sarkis | H04L 5/0044 |
| 2021/0092748 A1* | 3/2021 | Lee | H04L 1/0072 |
| 2022/0046673 A1* | 2/2022 | Takeda | H04L 5/0053 |
| 2022/0210800 A1* | 6/2022 | Babaei | H04L 5/0092 |
| 2022/0408464 A1* | 12/2022 | MolavianJazi | H04W 72/0453 |
| 2023/0134318 A1* | 5/2023 | Kang | H04W 16/28 370/329 |
| 2023/0139269 A1* | 5/2023 | MolavianJazi | H04L 5/0094 370/329 |
| 2023/0217456 A1* | 7/2023 | Yi | H04L 5/001 370/329 |
| 2023/0254857 A1* | 8/2023 | Moon | H04B 17/24 370/329 |
| 2023/0276441 A1* | 8/2023 | Wang | H04W 72/1273 370/329 |
| 2023/0362950 A1* | 11/2023 | Moon | H04B 7/088 |
| 2024/0057108 A1* | 2/2024 | Yi | H04L 1/1854 |
| 2024/0188070 A1* | 6/2024 | Shi | H04W 72/1263 |
| 2025/0016794 A1* | 1/2025 | Park | H04W 72/23 |
| 2025/0039901 A1* | 1/2025 | Li | H04W 72/0457 |
| 2025/0119260 A1* | 4/2025 | Cirik | H04L 5/0055 |

OTHER PUBLICATIONS

Written Opinion of the International Searching Authority, Application No. PCT/US2023/019965, dated Sep. 4, 2023, 6 pages.

NTT Docomo, Inc., "Enhancements on multi-TRP/panel transmission", R1-1912893, 3GPP TSG RAN WG1 Meeting #99, Reno, USA; Nov. 18, 2019, 21 pages.

* cited by examiner

METHODS FOR DCI CONFIGURATIONS AND PROCEDURES WITH MULTI-CELL SCHEDULING DCI

CROSS REFERENCE TO RELATED APPLICATIONS

This application claims the benefit of U.S. Provisional Application No. 63/336,377, filed Apr. 29, 2022, which is incorporated by reference herein in its entirety.

BACKGROUND

Field

Various aspects generally relate to the field of wireless communications.

SUMMARY

Aspects of the approach described herein include a method by a user equipment (UE) in a wireless communication network, the method including the following steps. The method includes the step of receiving a downlink signal from a first base station associated with a first cell of a plurality of cells, the downlink signal including a first multi-cell scheduling downlink control information (DCI), the first multi-cell scheduling DCI providing scheduling information for the first cell and a second cell of the plurality of cells. The method further includes the step of transmitting data to or receiving data from the first base station and a second base station based on the scheduling information, wherein the second base station is associated with the second cell.

Aspects of the approach described herein include a user equipment (UE). The UE includes a radio frequency (RF) transceiver configured to transmit and receive, via at least one antenna. The UE also includes processing circuitry coupled to the RF transceiver. The processing circuitry is configured to cause receiving a downlink signal from a first base station associated with a first cell of a plurality of cells, the downlink signal including a first multi-cell scheduling downlink control information (DCI), the first multi-cell scheduling DCI providing scheduling information for the first cell and a second cell of the plurality of cells. The processing circuitry is further configured to cause transmitting data to or receiving data from the first base station and a second base station based on the scheduling information, wherein the second base station is associated with the second cell.

Aspects of the approach described herein include a method by a base station (BS) in a wireless communication network, the method including the following steps. The method includes the step of transmitting a downlink signal to a user equipment (UE), wherein the first base station is associated with a first cell of a plurality of cells, the downlink signal including a first multi-cell scheduling downlink control information (DCI), the first multi-cell scheduling DCI providing scheduling information for the first cell and a second cell of the plurality of cells. The method also includes the step of transmitting data to or receiving data from the UE based on the scheduling information.

Aspects of the approach described herein include a base station (BS) in a wireless communications network. The BS includes a radio frequency (RF) transceiver configured to transmit and receive, via at least one antenna, and processing circuitry coupled to the RF transceiver. The processing circuitry is configured to cause transmit a downlink signal to a user equipment (UE), wherein the first base station is associated with a first cell of a plurality of cells, the downlink signal including a first multi-cell scheduling downlink control information (DCI), the first multi-cell scheduling DCI providing scheduling information for the first cell and a second cell of the plurality of cells. The processing circuitry is further configured to cause transmit data to or receive data from the UE based on the scheduling information, wherein the second base station is associated with the second cell.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Figure 1:
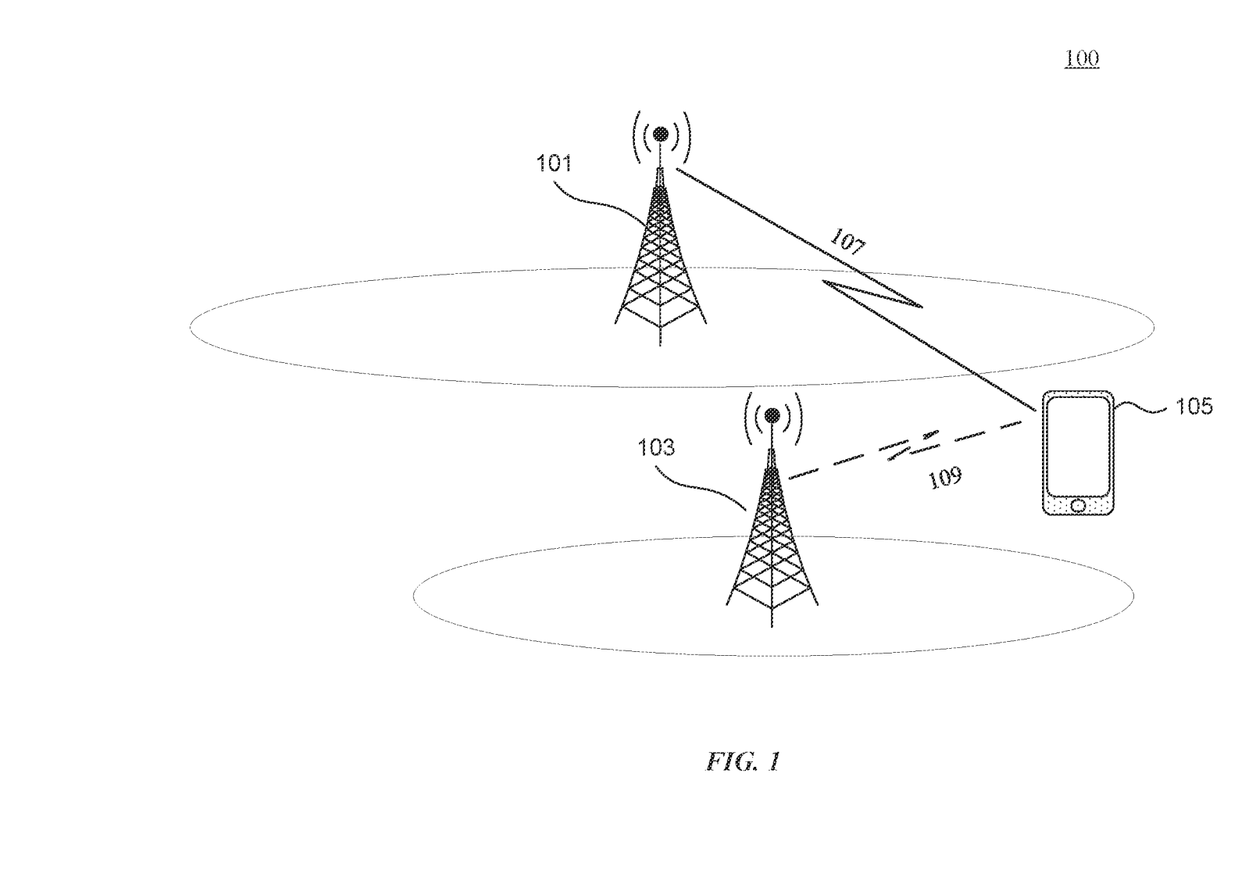
FIG. 1 illustrates an example system implementing for performing multi-cell scheduling DCI procedures between a user equipment (UE) and base stations in a wireless communication network, according to some aspects of the disclosure.

FIG. 1 illustrates an example system implementing mechanisms for performing multi-cell scheduling DCI procedures, according to some aspects of the disclosure. Example system 100 is provided for the purpose of illustration only and does not limit the disclosed aspects. System 100 may include, but is not limited to, network nodes (for example, base stations such as eNBs and gNBs) 101 and 103 and electronic device (for example, a UE) 105. Electronic device 105 (hereinafter referred to as UE 105) can be configured to operate based on a wide variety of wireless communication techniques. These techniques can include, but are not limited to, techniques based on 3rd Generation Partnership Project (3GPP) standards. For example, UE 105 can be configured to operate using the 3GPP standards. UE 105 can include, but is not limited to: a wireless communication device, a smart phone, a laptop, a desktop, a tablet, a personal assistant, a monitors, a television, a wearable device, Internet of Things (IoTs), a vehicle's communication device, and the like. Network node 101 (herein referred to as a base station) can include nodes configured to operate based on a wide variety of wireless communication techniques such as, but not limited to, techniques based on 3GPP standards.

According to some aspects, UE 105 and base stations 101 and 103 are configured to implement mechanisms for UE 105 for performing multi-cell scheduling DCI procedures. In some aspects, UE 105 is configured for performing multi-cell scheduling DCI procedures and single-cell scheduling DCI procedures simultaneously. According to some aspects, UE 105 can be connected to and can be communicating with base stations 101 and 103.

According to some aspects, UE 105 can perform various combinations of multi-cell scheduling DCI procedures and single-cell scheduling DCI procedures for communication with base station 101 and other base stations in a group of base stations.

Figure 2:
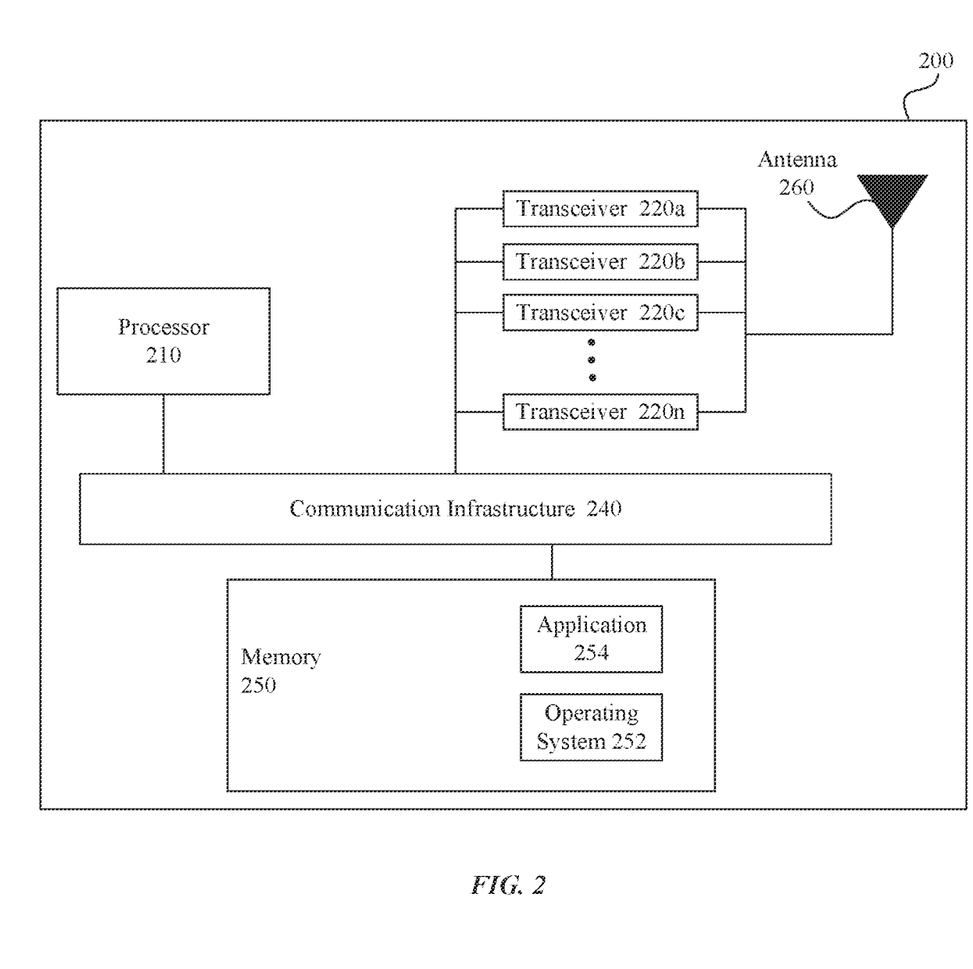
FIG. 2 illustrates a block diagram of an example system of an electronic device for performing multi-cell scheduling DCI procedures, according to some aspects of the disclosure.

FIG. 2 illustrates a block diagram of an example system 200 of an electronic device implementing multi-cell scheduling DCI procedures, according to some aspects of the disclosure. System 200 may be any of the electronic devices (e.g., base stations 101, 103, UE 105) of system 100. System 200 includes processor 210, one or more transceivers 220a-220n, communication infrastructure 240, memory 250, operating system 252, application 254, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220a-220n. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to radio streaming, video streaming, remote control, and/or other user applications.

System 200 can also include communication infrastructure 240. Communication infrastructure 240 provides communication between, for example, processor 210, one or more transceivers 220a-220n, and memory 250. In some implementations, communication infrastructure 240 may be a bus.

In embodiments, processor 210 together with instructions stored in memory 250 performs operations enabling system 200 of system 100 to implement mechanisms for multi-cell scheduling DCI procedures as described herein. Alternatively, in embodiments, processor 210 can be "hard-coded" to implement, or cause to implement, mechanisms for multi-cell scheduling DCI procedures as described herein.

One or more transceivers 220a-220n transmit and receive communications signals that support mechanisms for performing multi-cell scheduling DCI procedures, according to some aspects, and may be coupled to antenna 260. Antenna 260 may include one or more antennas that may be the same or different types. One or more transceivers 220a-220n allow system 200 to communicate with other devices that may be wired and/or wireless. In some examples, one or more transceivers 220a-220n can include processors, controllers, radios, sockets, plugs, buffers, and like circuits/devices used for connecting to and communication on networks. According to some examples, one or more transceivers 220a-220n include one or more circuits to connect to and communicate on wired and/or wireless networks.

According to some aspects, one or more transceivers 220a-220n can include a cellular subsystem, satellite subsystem, a WLAN subsystem, and/or a Bluetooth™ subsystem, each including its own radio transceiver and protocol(s) as will be understood by those skilled arts based on the discussion provided herein. In some implementations, one or more transceivers 220a-220n can include more or fewer systems for communicating with other devices.

In some examples, one or more transceivers 220a-220n can include one or more circuits (including a WLAN transceiver) to enable connection(s) and communication over WLAN networks such as, but not limited to, networks based on standards described in IEEE 802.11. Additionally, or alternatively, one or more transceivers 220a-220n can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, one or more transceivers 220a-220n can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220a-220n can be configured to operate according to one or more of Rel-15, Rel-16, Rel-17, or other of the 3GPP standard.

In addition, one or more transceivers 220a-220n can include one or more circuits for connecting to and communicating with multiple cells via their respective base stations. Such base station types of networks can include, but are not limited to, wireless communication networks such as 3G/4G/5G networks such as Universal Mobile Telecommunications System (UMTS), and Long-Term Evolution (LTE). For example, one or more transceivers 220a-220n can be configured to operate according to one or more of Rel-15, Rel-16, Rel-17, or other of the 3GPP standard.

According to some aspects, processor 210, alone or in combination with computer instructions stored within memory 250, and/or one or more transceiver 220a-220n, implements multi-cell scheduling DCI procedures, as discussed herein. For example, transceiver 220a can enable connection(s) and communication with, for example, base stations 101 and 103 of FIG. 1). In this example, processor 210 in combination with transceiver 220a and/or transceiver 220b can perform multi-cell scheduling DCI procedures (for example, with base station 101 of FIG. 1 and other base stations not shown in FIG. 1). Although the operations discussed herein are discussed with respect to processor 210, it is noted that processor 210, alone or in combination with computer instructions stored within memory 250, and/or one or more transceiver 220a-220n, can implement these operations.

Multicarrier Enhancements

As part of the expansion of wireless capability, the need arises for a solution for multi-cell PUSCH/PDSCH (physical uplink shared channel/physical downlink shared channel) scheduling (e.g., one PDSCH/PUSCH per cell) using a single downlink control information (DCI). In pursuing such a solution, several considerations may be studied, including identification of the maximum number of cells that can be scheduled simultaneously, consideration of both intra-band and inter-band carrier aggregation (CA) operation. Additional considerations that may be studied may include both frequency ranges, FR1 and FR2, as well as consideration to a single DCI being optimized for 3 or more cells for the multi-cell PUSCH/PDSCH scheduling.

Challenges

When downlink control information (DCI) scheduling of multiple cells is introduced, a number of initial issues need to be addressed. First, the kind of configurations to be supported by the DCI scheduling of multiple cells needs to be identified. Second, the kind of combinations between the multi-cell scheduling DCI and the legacy single-cell scheduling DCI to be supported also needs to be identified. Also, as part of identifying the objectives, it needs to be established how the number of PDCCH candidates (i.e., blind decoding (BD) candidates) and control channel elements (CCEs) be counted. In addition, the impact of the multi-cell scheduling approach on the overbooking/candidate dropping procedure also needs to be considered.

Turning to the issue of BD/CCE counting, the previous or legacy approach in single cell scheduling, the counting of BDs and CCEs was done on a per-scheduled cell. Thus, if a multi-cell scheduling DCI approach is introduced, it is no longer possible to strictly count BDs/CCEs per scheduled cell because one DCI can now schedule one or multiple cells.

Turning to the issue of the appropriate limit on the number of DCI sizes, the previous or legacy approach placed a limit on the number of DCI sizes per scheduled cell. These limits included a limit that the total number of different DCI sizes configured to monitor were no more than four (4) for the cell. These limits also included a limit that the total number of different DCI sizes with cell-radio network temporary identifier (C-RNTI) configured to monitor was no more than three (3) for the cell. As part of these limits, some DCI size alignment rules had been defined to satisfy these limits.

If new DCI formats are introduced to support multi-cell scheduling for PDSCH and PUSCH, there is potentially two more DCI sizes, and the ability to satisfy the limits on the number of DCI sizes needs to be considered.

DSS Enhancement and BD/CCE Counting

An additional consideration in developing an approach for the DCI scheduling of multiple cells is that of cross carrier scheduling (CCS) and its impact on BD/CCE counting. When cross carrier scheduling from a sSCell (scheduling secondary cell) to a P(S)Cell (primary and secondary cell) is configured, a budget for BD/CCE needs to be split between the primary cell and the secondary cell. PCell-CCSscaling, i.e., a, is radio resource controlled (RRC) configured to semi-statically split the maximum BD and CCE between P(S)Cell and sSCell. Per slot of the active DL BWP of the primary cell.

For a P(S)Cell, the UE is not required to monitor more than $\alpha*\min(M_{PDCCH}^{max,slot,\mu P}, M_{PDCCH}^{total,slot,\mu P})$ PDCCH candidates, or more $\alpha*\min(C_{PDCCH}^{max,slot,\mu P}, C_{PDCCH}^{total,slot,\mu P})$ non-overlapping CCEs.

For a sSCell, UE is not required to monitor more than $(1\alpha)*\min(M_{PDCCH}^{max,slot,\mu P}, M_{PDCCH}^{total,slot,\mu P})$ PDCCH candidates, or more than $(1-\alpha)*\min(C_{PDCCH}^{max,slot,\mu P}, C_{PDCCH}^{total,slot,\mu P})$ non-overlapping CCEs.

For the $(M_{PDCCH}^{total,slot,\mu P})$ and $(C_{PDCCH}^{total,slot,\mu P})$ calculations, in the case of P(S)Cell self-scheduling, counting is conducted by applying a scaling factor of 1. In the case of sSCell to P(S)Cell scheduling (assuming subcarrier spacing (SCS) of sSCell), these are not counted additionally.

DCI Configurations and BD/CCD Counting

In developing the DCI configurations below, it is assumed that a multi-cell scheduling DCI can schedule PDSCHs or PUSCHs on 1, 2, . . . , or N component carriers (CCs) simultaneously, where N is the maximum number of CCs that can be scheduled.

TABLE 1

| CC group | Option 1 | Option 2 | Option 3 | Option 4 | Option 5 |
|---|---|---|---|---|---|
| CC1 | MC | MC | MC | MC/SC | MC/SC |
| CC2 |  | MC | SC | SC | MC/SC |
| CC3 |  | MC | SC | SC | MC/SC |
| CC4 |  | MC | SC | SC | MC/SC |

For a group of cells that are enabled with one DCI scheduling multiple cells, there can be different options for supported DCI configurations on different CCs. Table 1 shows several embodiments for the case where one DCI can schedule up to 4 CCs (i.e., N=4). Persons of skill in the art will recognize that these embodiments are exemplary, and not limiting, using the principles outlined below. In Table 1, the following terminology is used. The "MC" notation refers to a UE-specific search space (USS) configured with a multi-cell scheduling DCI. In the example shown in Table 1, it is assumed that the multi-cell scheduling DCI can schedule 1, 2, 3, or 4 CCs. The total of four (4) is exemplary, and not limiting.

The "SC" notation refers to a USS configured with a single-cell scheduling DCI, which is the legacy approach. Note that only USSs are considered in these options. The other category of search space, i.e., common search space (CSS) configurations may follow the legacy approach.

Table 1 illustrates an example of four component carrier (CC) groups, labelled CC1, CC2, CC3 and CC4. The different options illustrate various examples of multi-cell scheduling. Referring to Option 1, only one component carrier (CC) is configured with a multi-cell scheduling DCI. Thus, in this option, there is no DCI configured on the other CCs. In this option, the DCI can schedule any combinations of up to 4 CCs.

With respect to the BD/CCE counting aspect of Option 1, there are three alternatives. In the first alternative, BDs/CCEs for multi-cell scheduling DCIs are counted towards the limit of the scheduling cell (CC1 in Option 1), while the limit of the scheduling cell is kept unchanged compared to legacy systems. In the second alternative, BDs/CCEs for multi-cell scheduling DCIs are split between the CCs that can be scheduled, and the other CCs are considered as cross-carrier scheduled by this one CC. In this alternative, this means that for component carrier groups CC2 through to CC4, the BD/CCE limits are determined based on the numerology of the scheduling cell. In terms of the split factors, these may be pre-defined or configured. In one embodiment of this approach, the BDs/CCEs are equally split between the CCs. In either the first alternative or the second alternative above, the remaining procedures for counting the BDs/CCEs can reuse the legacy approach. In the third alternative, BDs/CCEs for multi-cell scheduling DCIs are counted towards the limit of the scheduling cell (CC1 in Option 1), with the limit of the scheduling cell being increased compared to legacy systems. This may be possible without increasing overall UE complexity because the other CCs (CC2/CC3/CC4) are not configured with PDCCH monitoring. The limit can be defined as a scaling factor times the legacy BD/CCE limits, where the scaling factor can be either pre-defined or configured by the base station, which may be further subject to UE capability. In one embodiment of this approach, the scaling factor can be the same as the maximum number of scheduled CCs (4 in the example). The third alternative may lead to similar outcome as the second alternative.

Continuing to refer to Table 1, in Option 2, all the CCs may be configured with multi-cell scheduling DCIs. This option allows the configuration of multi-cell scheduling DCIs on any CC, which provides more flexibility to the network on PDCCH scheduling compared to Option 1. Different embodiments of this second option include, for example, only some of the CCs are configured with multi-cell scheduling DCIs. Thus, in this sense, Option 1 may be considered as a special case of Option 2.

In terms of BD/CCE counting for Option 2, BDs/CCEs for each multi-cell scheduling DCI are counted towards the limit of the corresponding scheduling cell. It is noted that the main drawback of Option 1 and Option 2 is the larger DCI overhead incurred even in the situation that there is only a single CC being scheduled.

Continuing to refer to Table 1 and now turning to Option 3, only one CC is configured with multi-cell scheduling DCI, while the other CCs can be configured with the legacy single-cell scheduling. Compared to Option 1 and Option 2, Option 3 allows the other CCs to be configured with the legacy single-cell scheduling DCIs to reduce the overhead when, for example, only one CC needs to be scheduled. This is because the DCI size of the multi-cell scheduling DCI is larger than that of the single-cell scheduling DCI. In various embodiments of Option 3, only some of the CCs are configured with single-cell scheduling DCIs.

At least two alternatives are available for BD/CCE counting in Option 3. In the first alternative, BDs/CCEs for multi-cell scheduling DCIs are counted towards the limit of the scheduling cell (CC1 in the example illustrated in Table 1). In the second alternative, BDs/CCEs for multi-cell scheduling DCIs are split between the CCs that can be scheduled. As in the other Options, the split factors may be pre-defined or configured. In one embodiment, the BDs/CCEs are equally split between the CCs.

With this counting for Option 3, with respect to CC2, CC3, and CC4, BDs/CCEs are contributed from both multi-cell scheduling DCI on CC1 and the self-scheduling DCI on itself. The BD/CCE limits for a scheduled cell may be split between the two scheduling cells.

In one variation of the second alternative for BD/CCE counting in Option 3, a mechanism similar to secondary cell (SCell) scheduling primary cell (PCell) in 3GPP Release 17 may be reused, where the BD/CCE limits for the scheduled cell are derived based on the numerology of the scheduled cell, and the time unit is a slot in the scheduled cell. The split of BD/CCE limits between the two scheduling cells is defined by a split factor, which can be predefined or configured by the network in the current approach. It is noted that this mechanism is defined in 3GPP Release 17 only for the case when the subcarrier spacing (SCS) of the scheduling cell is no smaller than the SCS of the scheduled cell.

Continuing with the current approach, in a second variation of the second alternative for BD/CCE counting in Option 3, the BD/CCE limits for the scheduled cell are derived based on the smaller subcarrier spacing (SCS) between the scheduling cell and the scheduled cell, and the time unit is a slot based on the smaller SCS. This is an extension of the first variation that handles all the cases regardless of the SCSs of the two cells.

Again, referring to Table 1, in Option 4, one CC is configured with both multi-cell scheduling DCIs and the legacy single-cell scheduling DCIs, and the other CCs can be configured with the legacy single-cell scheduling DCIs. Thus, Option 4 is similar to Option 3, with the only difference being that one CC is configured with both multi-cell scheduling DCI and the legacy single-cell scheduling DCI, instead of multi-cell scheduling DCI only, as in Option 3. Option 4 allows further DCI overhead reduction if the network schedules CC1 only. Embodiments of Option 4 include, for example, only some of the CCs are configured with single-cell scheduling DCIs. In this sense, Option 3 can be considered as a special case of Option 4.

In terms of the BD/CCE counting approach in Option 4, there are at least two alternatives. In the first alternative, BDs/CCEs for multi-cell scheduling DCIs are counted towards the limit of the scheduling cell (CC1 in the example). In the second alternative, BDs/CCEs for multi-cell scheduling DCIs are split between the CCs that can be scheduled. In a similar manner to that described in Option 3, the split factors for Option 4 can be pre-defined or configured. A special example of Option 4 is when the BDs/CCEs are equally split between the CCs.

Continuing with the BD/CCE counting approach for Option 4, the handling of CC1 as the scheduled cell is straightforward because it is always self-scheduling. For CC2, CC3, and CC4, the BDs/CCEs are contributed from both multi-cell scheduling DCI on CC1 and the self-scheduling DCI on itself. The BD/CCE limits for a scheduled cell can be split between the two scheduling cells. The variations of the second alternative described in Option 3 are also applicable here to Option 4.

Again, referring to Table 1, in Option 5, all the CCs can be configured with both multi-cell scheduling DCIs and the legacy single-cell scheduling DCIs. Embodiments of Option 5 include, for example, each CC can be configured with either multi-cell scheduling DCIs only, or single-cell scheduling DCIs only, or both. In this sense, Options 1, 2, 3 and 4 may all be considered as a special case of Option 5. In terms of the BD/CCE counting approach in Option 5, BDs/CCEs for each multi-cell scheduling DCI can be counted towards the limit of the corresponding scheduling cell.

With respect to all of the Options discussed above and illustrated in Table 1, a number of aspects are common to these Options. First, the DCI configurations may be the same or different for DL/PDSCH and UL/PUSCH. The embodiments assume self-scheduling for the CCs configured with single-cell scheduling DCI. One or more of these CCs may be configured with cross-carrier scheduling also, and the options are still applicable. Note that there can be other CCs not being part of multi-cell scheduling, which can operate in legacy mode and are not illustrated here for simplicity. Persons of ordinary skill in the art will recognize that the Options described are indicative of the scope of approaches considered, and the specific Options are not intended to be an exhaustive list of options.

Overbooking/Dropping

In legacy designs with single cell DCI scheduling, overbooking and dropping of PDCCH candidates is supported for UE-specific search spaces (USSs) on primary cell (PCell) or primary secondary (PSCell) only, and it is gNB's responsibility to ensure the BD/CCE limits are met after the potential dropping on PCell/PSCell. With multi-cell scheduling DCI, the principle of allowing overbooking/dropping only on P(S)Cell can be followed, as discussed below.

Turning to multi-cell scheduling, there are at least two dropping approaches, In one dropping approach, the dropping follows the legacy procedure, i.e., it is based on USS index. The network can set the USS index properly to control which USS(s) to be dropped (e.g., to drop the USS with single-cell scheduling DCIs or the USS with multi-cell scheduling DCIs). Alternatively, it can be mandated that the USS with multi-cell scheduling DCIs should have lower index than the USS with single-cell scheduling DCIs. In a second dropping approach, a higher priority can be given to the USS(s) with multi-cell scheduling DCIs, meaning that USS(s) with single-cell scheduling DCIs are dropped before USS(s) with multi-cell scheduling DCIs. As the second-level criterion, that is, among the USSs with single-cell scheduling DCIs or among the USSs with multi-cell scheduling DCIs, the USS index can be used as the criterion for dropping.

If BDs/CCEs for multi-cell scheduling DCI are split among the scheduled cell, when reusing the legacy mechanism for overbooking/dropping on PCell/PSCell, only the BDs/CCEs allocated to the PCell/PSCell are counted towards the limits. For US S-level dropping, the entire USS is dropped if it needs be dropped according to PCell/PSCell counting. Alternatively, PDCCH candidate level dropping instead of USS-level dropping can be supported to avoid dropping the entire USS. However, this approach introduces additional complexity for the UE.

DCI Formats

Two possible approaches for DCI formatting for multi-cell scheduling are described. A multi-cell scheduling DCI may use a new DCI Format or be modified/extended using an existing DCI Format. A new DCI Format may be necessary if both single-cell and multi-cell scheduling DCIs can be configured on the same CC, and the same configurations are shared for the PDSCH/PUSCH scheduled by the single-cell and multi-cell scheduling DCIs. In this case, the approach needs to differentiate between the two types of DCIs. A new DCI Format for multi-cell scheduling DCI with a different size is one way to provide this differentiation.

For example, for PDSCH scheduling, if DCI Format 1_1/1_2 can be configured together with the multi-cell scheduling DCI on a cell, a new DCI Format would be used for the multi-cell scheduling DCI. On the other hand, for example, if DCI Format 1_1 (or 1_2) is not allowed to be configured together with the multi-cell scheduling DCI on a cell, the multi-cell scheduling DCI may reuse DCI Format 1_1 (or 1_2) by adding some additional DCI fields and/or modifying some existing DCI fields. It should be noted that the introduction of new DCI formats requires separate definitions for PDSCH and PUSCH scheduling.

Limit on the Number of DCI Sizes and DCI Size Alignment

Up to 3GPP Release 17, the limit on the number of DCI sizes per scheduled cell include the following two cases. In the first case, the total number of different DCI sizes configured to monitor is no more than 4 for the cell. In the second case, the total number of different DCI sizes with C-RNTI configured to monitor is no more than 3 for the cell. In addition, in 3GPP Release 15/16/17, some DCI size alignment rules have been defined to satisfy the limits.

For multi-cell DCI scheduling, new DCI Formats may be introduced to support multi-cell PDSCH/PUSCH scheduling, for example, DCI Format 1_3 for multi-cell PDSCH scheduling and DCI Format 0_3 for multi-cell PUSCH scheduling. These new DCI formats may be configured together with legacy DCI formats on the same component carrier (CC), with potentially two more DCI sizes, and the current limit on the number of DCI sizes may be exceeded.

For multi-cell DCI scheduling, the first issue to be addressed is to which cell the sizes of the new DCI formats should be counted. In the legacy approach, it is counted for each scheduled cell. But with multi-cell scheduling, there are multiple scheduled cells for a DCI. With multi-cell scheduling, it is more straightforward to count it towards the budget for the scheduling cell.

In terms of the handling of the limits on the number of DCI sizes, there are two approaches. In the first approach, no additional DCI size alignment procedure is introduced, and it is left to the base station (e.g., gNB) implementation to ensure that the limits are not exceeded by proper configuration. In the second approach, if the DCI size limits are exceeded after applying the legacy procedures on DCI size alignment, the UE aligns the sizes of the two new DCI formats for multi-cell PDSCH and PUSCH scheduling. It is left to the base station (e.g., gNB) implementation to ensure that the limits are not exceeded after this alignment.

Alternatively, or additionally, the limits on the number of DCI sizes can be increased. However, this may be undesirable because it increases the required UE complexity.

Figure 3A:
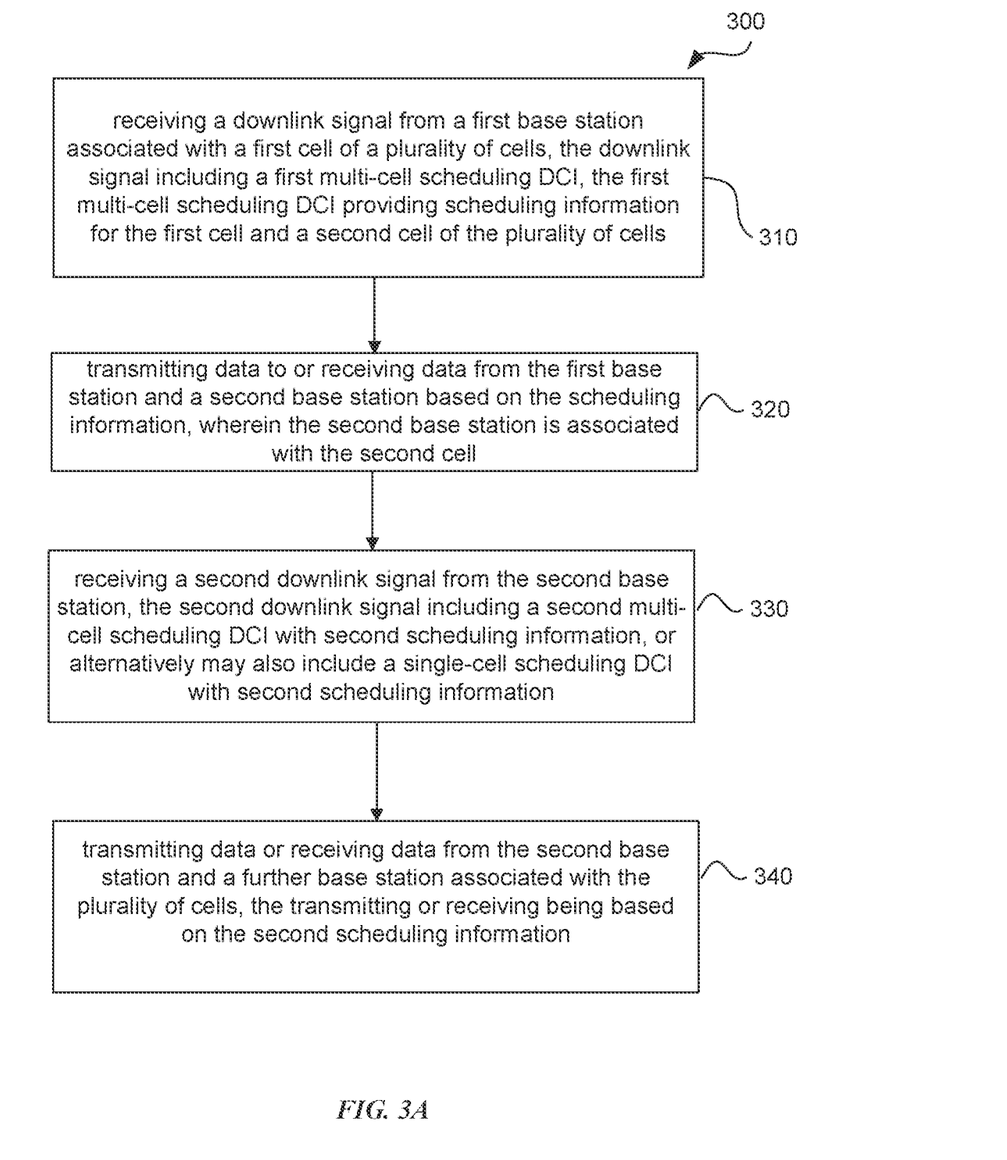
FIG. 3A illustrates a flowchart diagram of a method 300 for performing multi-cell scheduling DCI procedures, in accordance with aspects of the present disclosure.

Summary of Methods for DCI Configurations and Procedures with Multi-Cell Scheduling DCI FIG. 3A illustrates a flowchart diagram of a method 300 for multi-cell scheduling in a wireless network, in accordance with aspects of the present disclosure. Step 310 includes receiving a downlink signal from a first base station associated with a first cell of a plurality of cells, the downlink signal including a first multi-cell scheduling downlink control information (DCI), the first multi-cell scheduling DCI providing scheduling information for the first cell and a second cell of the plurality of cells.

Step 320 includes transmitting data to or receiving data from the first base station and a second base station based on the scheduling information, wherein the second base station is associated with the second cell.

A further embodiment adds steps 330 and 340. Step 330 includes receiving a second downlink signal from the second base station, the second downlink signal including a second multi-cell scheduling DCI with second scheduling information. Alternatively, step 330 may also include receiving a second downlink signal from the second base station, the second downlink signal including a single-cell scheduling DCI with second scheduling information.

Step 340 includes transmitting data to or receiving data from the second base station and a further base station associated with the plurality of cells, the transmitting or receiving being based on the second scheduling information.

Figure 3B:
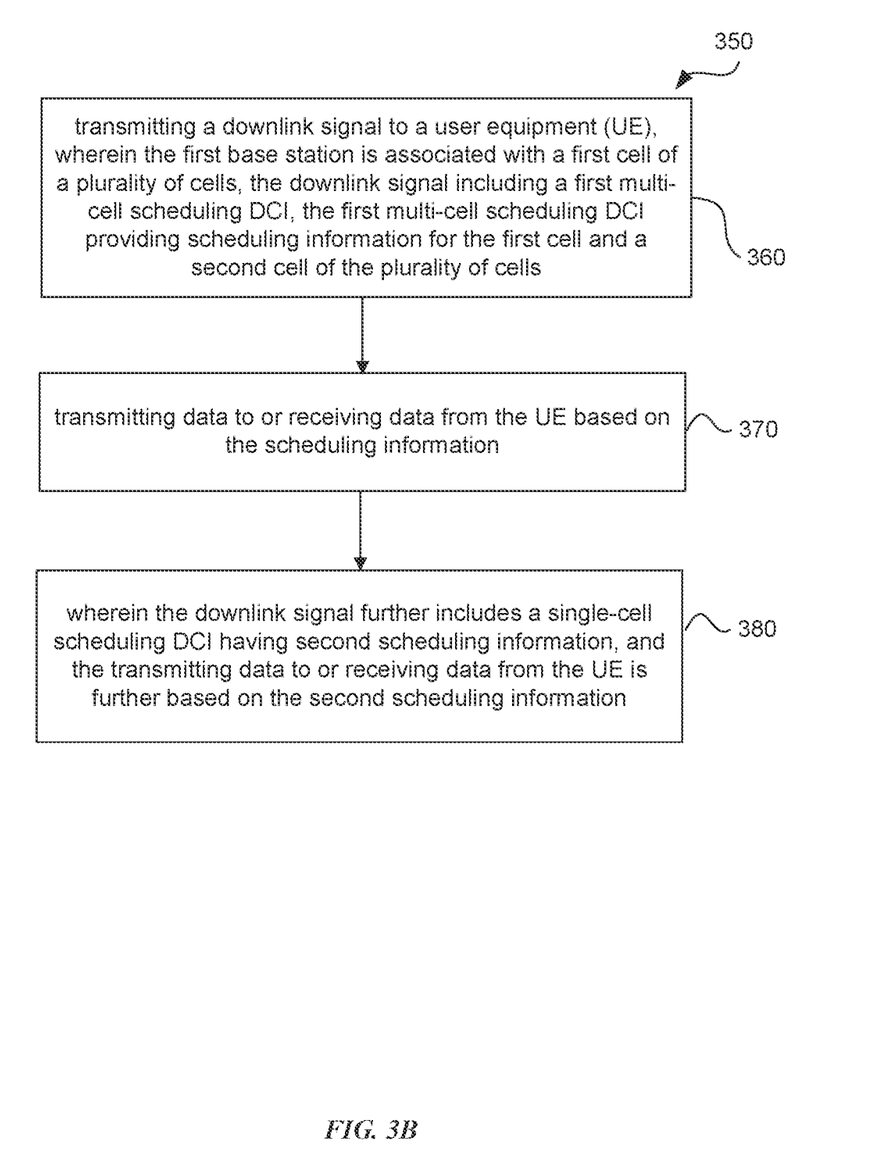
FIG. 3B illustrates a flowchart diagram of a method 350 for performing multi-cell scheduling DCI procedures, in accordance with aspects of the present disclosure.

FIG. 3B illustrates a flowchart diagram of a method 350 for multi-cell scheduling in a wireless network, in accordance with aspects of the present disclosure. Step 360 includes transmitting by a first base station a downlink signal to a UE, the first base station associated with a first cell of a plurality of cells, the downlink signal including a first multi-cell scheduling downlink control information (DCI), the first multi-cell scheduling DCI providing scheduling information for the first cell and a second cell of the plurality of cells.

Step 370 includes, transmitting data to or receiving data from the UE, by the first base station based on the scheduling information.

A further embodiment adds step 380. Step 380 includes the clause wherein the downlink signal further includes a single-cell scheduling DCI having second scheduling information, and the transmitting data to or receiving data from the UE is further based on the second scheduling information.

Exemplary Computer System

Figure 4:
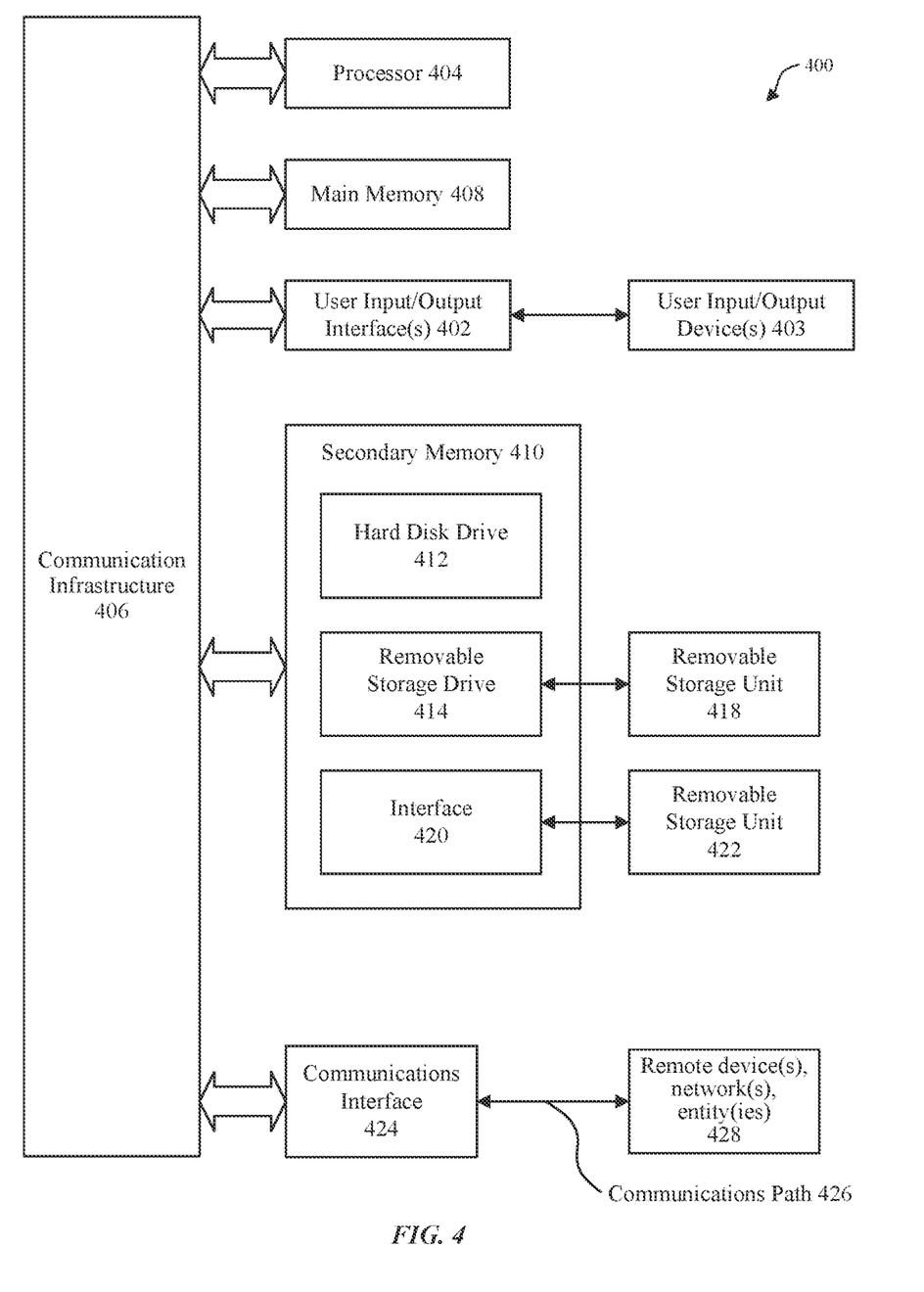
FIG. 4 is an example computer system for implementing some aspects or portion(s) thereof.

Various aspects can be implemented, for example, using one or more computer systems, such as computer system 400 shown in FIG. 4. Computer system 400 can be any well-known computer capable of performing the functions described herein such as devices 101, 103, 105 of FIG. 1, or 200 of FIG. 2. Computer system 400 includes one or more processors (also called central processing units, or CPUs), such as a processor 404. Processor 404 is connected to a communication infrastructure 406 (e.g., a bus.) Computer system 400 also includes user input/output device(s) 403, such as monitors, keyboards, pointing devices, etc., that communicate with communication infrastructure 406 through user input/output interface(s) 402. Computer system 400 also includes a main or primary memory 408, such as random access memory (RAM). Main memory 408 may include one or more levels of cache. Main memory 408 has stored therein control logic (e.g., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to some aspects, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and may include any combination of LANs, WANs, the Internet, etc. Control logic and/or data may be transmitted to and from computer system 400 via communication path 426.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 400, main memory 408, secondary memory 410 and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 4. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "an example aspect," or similar phrases, indicate that the aspect described may include a particular feature, structure, or characteristic, but every aspects may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. The breadth and scope of the disclosure should not be limited by any of the above-described exemplary aspects, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates aspects in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed aspects, the present disclosure also contemplates that the various aspects can also be implemented without the need for accessing such personal information data. That is, the various aspects of the present technology are not rendered inoperable due to the lack of all or a portion of such personal information data.

What is claimed is:

1. A method by a user equipment (UE) in a wireless communication network, the method comprising:
   receiving a downlink signal from a first base station associated with a first cell of a plurality of cells, the downlink signal including a first multi-cell scheduling downlink control information (DCI), the first multi-cell scheduling DCI providing scheduling information for the first cell and a second cell of the plurality of cells, wherein receiving the downlink signal includes monitoring a UE-specific search space, and wherein a limit of blind decoding (BD) candidates/control channel elements (CCEs) is equal to a limit of blind decoding (BD) candidates/control channel elements (CCEs) used in legacy systems; and
   transmitting data to or receiving data from the first base station and a second base station based on the scheduling information, wherein the second base station is associated with the second cell.

2. The method of claim 1, further comprising:
   receiving a second downlink signal from the second base station, the second downlink signal including a second multi-cell scheduling DCI with second scheduling information; and
   transmitting data to or receiving data from the second base station and an additional base station associated with the plurality of cells, the transmitting or receiving being based on the second scheduling information.

3. The method of claim 1, further comprising:
   receiving a second downlink signal from the second base station, the second downlink signal including a single-cell scheduling DCI with second scheduling information; and
   transmitting data to or receiving data from the second base station, the transmitting or receiving being further based on the second scheduling information.

4. The method of claim 1, wherein the downlink signal further includes a single-cell scheduling DCI having second scheduling information, and the transmitting data to or receiving data from the first base station is further based on the second scheduling information.

5. The method of claim 1, wherein the downlink signal further includes a single-cell scheduling DCI having second scheduling information, and the transmitting data to or receiving data from the first base station is further based on the second scheduling information, and wherein the method further comprises:
receiving a second downlink signal from the second base station, the second downlink signal including a second multi-cell scheduling DCI and a single-cell scheduling information with second scheduling information; and
transmitting data to or receiving data from the second base station and an additional base station associated with the plurality of cells, the transmitting or receiving being based on the second scheduling information.

6. The method of claim 1, wherein a number of blind decoding candidates associated with the first multi-cell scheduling DCI exceeds a limit for the first cell, the method further comprising dropping at least one of the number of blind decoding candidates based on a UE-specific search space (USS) index or based on candidate-level dropping.

7. The method of claim 1, wherein a number of blind decoding candidates associated with the first multi-cell scheduling DCI exceeds a limit for the first cell, the method further comprising dropping at least one of the number of blind decoding candidates based on at least one of a first priority associated with a USS associated with a multi-cell scheduling USS index, and a second priority associated with a USS index.

8. The method of claim 1, wherein a format of the first multi-cell scheduling DCI includes a DCI Format for scheduling physical downlink shared channels (PDSCHs) or a DCI Format for scheduling physical uplink shared channels (PUSCHs).

9. The method of claim 1, wherein a format of the first multi-cell scheduling DCI includes a DCI Format for scheduling physical downlink shared channels (PDSCHs) and a DCI Format for scheduling physical uplink shared channels (PUSCHs), and a size of the DCI Format for scheduling the PDSCHs and a size of the DCI Format for scheduling the PUSCHs are aligned.

10. A user equipment (UE) comprising:
a radio frequency (RF) transceiver configured to transmit and receive, via at least one antenna; and
processing circuitry coupled to the RF transceiver, the processing circuitry configured to cause:
receiving a downlink signal from a first base station associated with a first cell of a plurality of cells, the downlink signal including a first multi-cell scheduling downlink control information (DCI), the first multi-cell scheduling DCI providing scheduling information for the first cell and a second cell of the plurality of cells, wherein receiving the downlink signal includes monitoring a UE-specific search space (USS), and wherein a limit of blind decoding (BD) candidates/control channel elements (CCEs) is equal to a limit of blind decoding (BD) candidates/control channel elements (CCEs) used in legacy systems; and
transmitting data to or receiving data from the first base station and a second base station based on the scheduling information, wherein the second base station is associated with the second cell.

11. The UE of claim 10, where the processing circuitry is further configured to cause:
receiving a second downlink signal from the second base station, the second downlink signal including a second multi-cell scheduling DCI with second scheduling information; and
transmitting data to or receiving data from the second base station and an additional base station associated with the plurality of cells, the transmitting or receiving being based on the second scheduling information.

12. The UE of claim 10, where the processing circuitry is further configured to cause:
receiving a second downlink signal from the second base station, the second downlink signal including a single-cell scheduling DCI with second scheduling information; and
transmitting data to or receiving data from the second base station, the transmitting or receiving being further based on the second scheduling information.

13. The UE of claim 10, wherein the downlink signal further includes a single-cell scheduling DCI having second scheduling information, and the transmitting data to or receiving data from the first base station is further based on the second scheduling information.

14. The UE of claim 10, wherein the downlink signal further includes a single-cell scheduling DCI having second scheduling information, and the transmitting data to or receiving data from the first base station is further based on the second scheduling information, and wherein the processing circuitry is further configured to cause:
receiving a second downlink signal from the second base station, the second downlink signal including a second multi-cell scheduling DCI and a single-cell scheduling information with second scheduling information; and
transmitting data to or receiving data from the second base station and an additional base station associated with the plurality of cells, the transmitting or receiving being based on the second scheduling information.

15. The UE of claim 10, wherein a number of blind decoding candidates associated with the first multi-cell scheduling DCI exceeds a limit for the first cell, the method further comprising dropping at least one of the number of blind decoding candidates based on a USS index or based on candidate-level dropping.

16. The UE of claim 10, wherein a number of blind decoding candidates associated with the first multi-cell scheduling DCI exceeds a limit for the first cell, the method further comprising dropping at least one of the number of blind decoding candidates based on at least one of a first priority associated with a USS associated with a multi-cell scheduling USS index, and a second priority associated with a USS index.

17. The UE of claim 10, wherein a format of the first multi-cell scheduling DCI includes a DCI Format for scheduling physical downlink shared channels (PDSCHs) or a DCI Format for scheduling physical uplink shared channels (PUSCHs).

18. The UE of claim 10, wherein a format of the first multi-cell scheduling DCI includes a DCI Format for scheduling physical downlink shared channels (PDSCHs) and a DCI Format for scheduling physical uplink shared channels (PUSCHs), and a size of the DC Format for scheduling the PDSCHs and a size of the DC Format for scheduling the PUSCHs are aligned.

* * * * *